(12) United States Patent
Kai (10) Patent No.: US 11,445,074 B2
(45) Date of Patent: Sep. 13, 2022

(54) INFORMATION PROCESSING DEVICE, TOUCH PANEL DISPLAY METHOD, AND RECORDING MEDIUM

(71) Applicant: Mana Kai, Tokyo (JP)

(72) Inventor: Mana Kai, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/443,966

(22) Filed: Jul. 29, 2021

(65) Prior Publication Data

US 2022/0046134 A1 Feb. 10, 2022

(30) Foreign Application Priority Data

Aug. 4, 2020 (JP) .............................. JP2020-132640

(51) Int. Cl.
*H04N 1/00* (2006.01)
*G06F 3/041* (2006.01)

(52) U.S. Cl.
CPC ....... *H04N 1/00395* (2013.01); *G06F 3/0416* (2013.01); *H04N 1/00037* (2013.01); *H04N 1/00074* (2013.01); *H04N 1/00411* (2013.01)

(58) Field of Classification Search
CPC ........... H04N 1/00395; H04N 1/00037; H04N 1/00074; H04N 1/00411; H04N 1/00477; H04N 1/0048; H04N 1/0049; H04N 1/32657; G06F 3/0416; G06F 3/0488; G03G 15/5016
USPC ....................................................... 358/1.15
See application file for complete search history.

(56) References Cited

U.S. PATENT DOCUMENTS

| | | | | |
|---|---|---|---|---|
| 7,724,208 B1* | 5/2010 | Engel | ....................... | G09G 5/08 |
| | | | | 345/6 |
| 2010/0302173 A1* | 12/2010 | Deng | ................. | G03G 15/5075 |
| | | | | 345/173 |
| 2014/0191970 A1 | 7/2014 | Cho et al. | | |
| 2018/0181287 A1* | 6/2018 | O'Brien | ............. | G06F 3/04883 |

FOREIGN PATENT DOCUMENTS

| | | |
|---|---|---|
| JP | 4378999 | 12/2009 |
| JP | 5024397 | 9/2012 |
| JP | 5834834 | 12/2015 |

OTHER PUBLICATIONS

Extended European Search Report for 21188541.3 dated Dec. 23, 2021.

* cited by examiner

*Primary Examiner* — Kent Yip
(74) *Attorney, Agent, or Firm* — IPUSA, PLLC (57) ABSTRACT

An information processing device includes a standard layer configured to display an operation screen provided for use of a touch panel, a disable layer provided to overlap the standard layer, and an interrupt layer provided to overlap the standard layer and the disable layer. The information processing device further includes a processor, and a memory storing program instructions that cause the processor to disable a touch operation of the touch panel, display a touch operation disable screen on the disable layer to superimpose the touch operation disable screen on the operation screen, in a case where the touch operation is disabled, and display, when an interrupt event has occurred while the touch operation is disabled, a notification screen on the interrupt layer, the notification screen notifying the interrupt event.

4 Claims, 6 Drawing Sheets

INFORMATION PROCESSING DEVICE, TOUCH PANEL DISPLAY METHOD, AND RECORDING MEDIUM

CROSS-REFERENCE TO RELATED APPLICATION

The present application is based on and claims priority under 35 U.S.C. § 119 to Japanese Patent Application No. 2020-132640, filed on Aug. 4, 2020, the contents of which are incorporated herein by reference in their entirety.

BACKGROUND OF THE INVENTION

1. Field of the Invention

The present disclosure relates to an information processing device, a touch panel display method, and a non-transitory computer-readable recording medium that stores a touch panel display program.

2. Description of the Related Art

In an information processing device such as an MFP, a configuration, in which an operation command is input through a touch panel mounted to the device, is known.

Patent Document 1 describes a configuration in which, in response to receiving an input from an operation disable information display unit on the touch panel, an input of the touch panel is disabled for a predetermined time period.

RELATED-ART DOCUMENTS

Patent Documents

Patent Document 1: Japanese Patent No. 4378999

SUMMARY OF THE INVENTION

According to one aspect of an embodiment, an information processing device includes a standard layer configured to display an operation screen provided for use of a touch panel, a disable layer provided to overlap the standard layer, and an interrupt layer provided to overlap the standard layer and the disable layer. The information processing device further includes a processor, and a memory storing program instructions that cause the processor to disable a touch operation of the touch panel, display a touch operation disable screen on the disable layer to superimpose the touch operation disable screen on the operation screen, in a case where the touch operation is disabled, and display, when an interrupt event has occurred while the touch operation is disabled, a notification screen on the interrupt layer, the notification screen notifying the interrupt event.

DESCRIPTION OF THE EMBODIMENTS

In the conventional method of disabling the operation of the touch panel such as Patent Document 1, when an error occurs in a main device during a touch disable mode, an error and notification cannot be displayed, and there may be a case where the operation does not progress. Additionally, if an error or the like is displayed by interruption, an error screen may overwrite a disable state, and the disable state may be canceled at an unexpected timing, so that an error operation may be caused.

It is an object of the present disclosure to enable an interrupt notification to be displayed during the disable mode of the touch panel and to enable the disable mode to be maintained.

According to at least one embodiment of the present disclosure, the interrupt notification can be displayed during the disable mode of the touch panel, and the disable mode can be maintained.

In the following, an embodiment will be described with reference to the accompanying drawings. In order to facilitate the understanding of the description, the same components in each drawing are referenced by the same reference numeral, as far as possible, and the overlapping description is omitted.

<Hardware Configuration>

Figure 1:
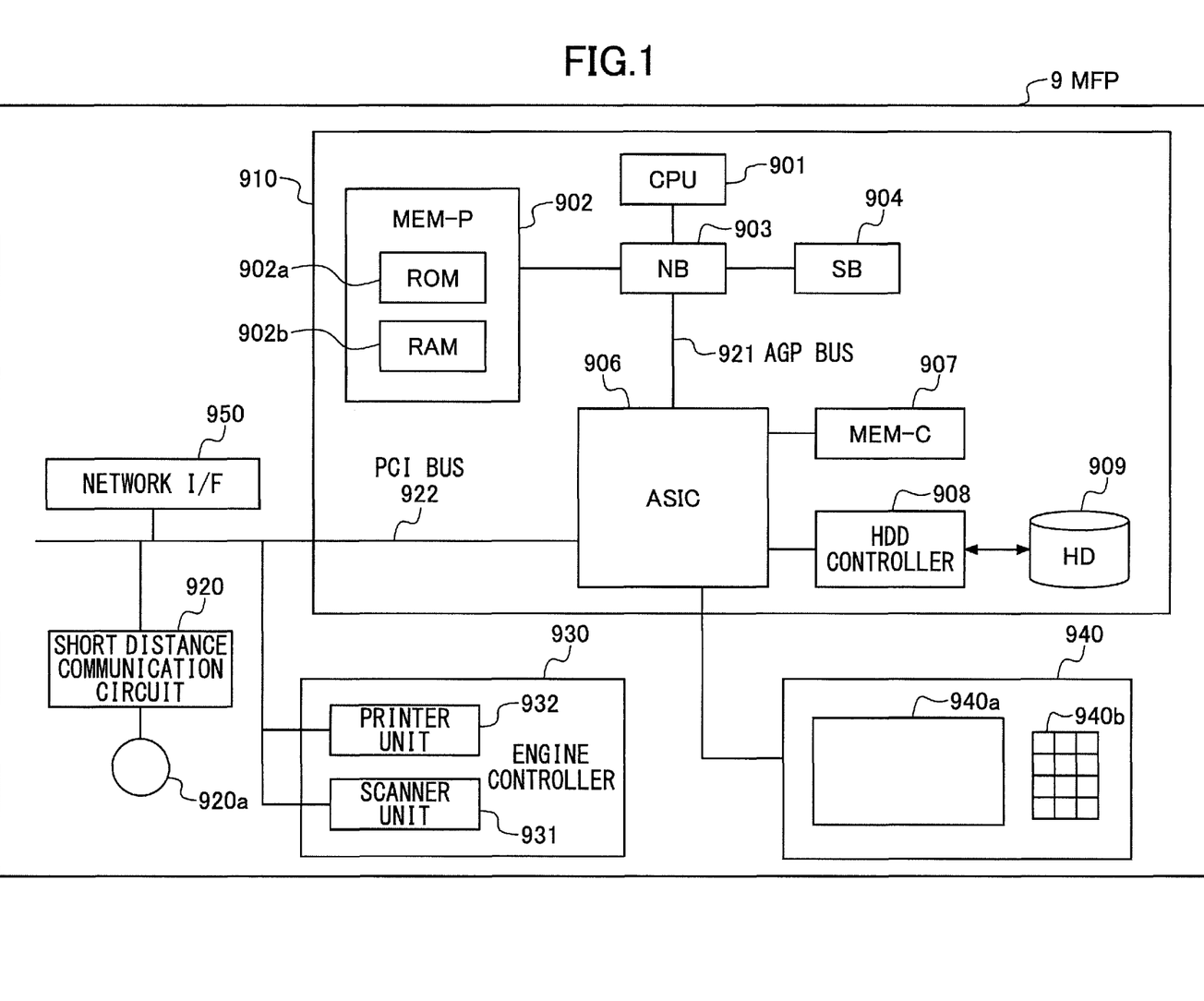
FIG. 1 is a diagram illustrating a hardware configuration of an information processing device according to an embodiment.

FIG. 1 is diagram illustrating a hardware configuration of an information processing device according to the embodiment.

The information processing device is, for example, a multifunction device called a multifunction peripheral/printer/product (MFP), that is, a device having an image processing function and a communication function, such as a facsimile, a scanner, a copy, and a printer. Hereinafter, the MFP will be described as an example of the information processing device.

As illustrated in FIG. 1, the MFP 9 includes a controller 910, a short distance communication circuit 920, an engine controller 930, an operation panel 940, and a network I/F 950.

Among these, the controller 910 includes a CPU 901, a system memory (MEM-P) 902, a north bridge (NB) 903, a south bridge (SB) 904, an application specific integrated circuit (ASIC) 906, which are a main part of a computer, a local memory (MEM-C) 907, which is a storage unit, an HDD controller 908, and an HD 909, which is a storage unit, and the NB 903 is connected to the ASIC 906 through an accelerated graphics port (AGP) bus 921.

Among these, the CPU 901 is a controller that entirely controls the MFP 9. The NB 903 is a bridge that connects the CPU 901 to the MEM-P 902, the SB 904, and the AGP bus 921, and includes a memory controller that controls reading data from and writing data to the MEM-P 902, a peripheral component interconnect (PCI) master, and an AGP target.

The MEM-P 902 includes a ROM 902a, which is a memory storing programs and data that achieve each function of the controller 910, and a RAM 902b, which is used to deploy programs or data and used as a drawing memory for printing from a memory. The programs stored in the RAM 902b may be recorded and provided in a computer-readable recording medium, such as a CD-ROM, a CD-R, or a DVD in a file in an installable format or an executable format.

The SB 904 is a bridge that connects the NB 903 to PCI devices and peripheral devices. The ASIC 906 is an integrated circuit (IC), for image processing applications, having hardware elements for image processing, and serves as a bridge that connects to the AGP bus 921, a PCI bus 922, the HDD controller 908, and an MEM-C 907. The ASIC 906 includes a PCI target and an AGP master, an arbiter (ARB) that is the core of the ASIC 906, a memory controller that controls the MEM-C 907, multiple direct memory access controllers (DMACs) that rotate image data and the like by using hardware logic and the like, and a PCI unit that transfers data between the scanner unit 931 and the printer unit 932 through the PCI bus 922. The interface of the universal serial bus (USB) or the institute of electronic and electronic engineers 1394 (IEEE 1394) may be connected to the ASIC 906.

The MEM-C 907 is a local memory used as an image buffer and a code buffer for copying. The HD 909 is a storage device that stores image data, stores font data used for printing, and stores forms. The HD 909 controls reading data from or writing data to the HD 909 based on the control of the CPU 901. The AGP bus 921 is a bus interface for graphics accelerator cards that is proposed to speed up graphics processing, and by directly accessing the MEM-P 902 with high throughput, the graphics accelerator card can speed up.

The short distance communication circuit 920 is provided with a short distance communication circuit 920a. The short distance communication circuit 920 is a communication circuit such as NFC, Bluetooth, or the like.

The engine controller 930 includes a scanner unit 931 and a printer unit 932. The operation panel 940 includes a panel display unit 940a (hereinafter, referred to as a "touch panel 940a") such as a touch panel that displays a current setting value, a selection screen, or the like, and that receives an input from an operator, and an operation panel 940b including a ten key that receives a setting value of a condition related to image forming, such as a density setting condition, a start key that receives a copy start instruction, and the like. The controller 910 entirely controls the MFP 9 and controls, for example, drawing, communication, input from the operation panel 940, and the like. The scanner unit 931 or the printer unit 932 includes a unit of image processing, such as for error diffusion or gamma conversion.

Here, an application switching key of the operation panel 940 allows the MFP 9 to sequentially switch between a document box function, a copy function, a printer function, and a facsimile function to be selected. When the document box function is selected, the MFP 9 switches to a document box mode, when the copy function is selected, the MFP 9 switches to a printer mode, and when the facsimile function is selected, the MFP 9 switches to a facsimile mode.

The network I/F 950 is an interface for performing data communication by using a communication network. The short distance communication circuit 920 and the network I/F 950 are electrically connected to the ASIC 906 through a PCI bus 922.

<Configuration of Touch Panel>

Figure 2:
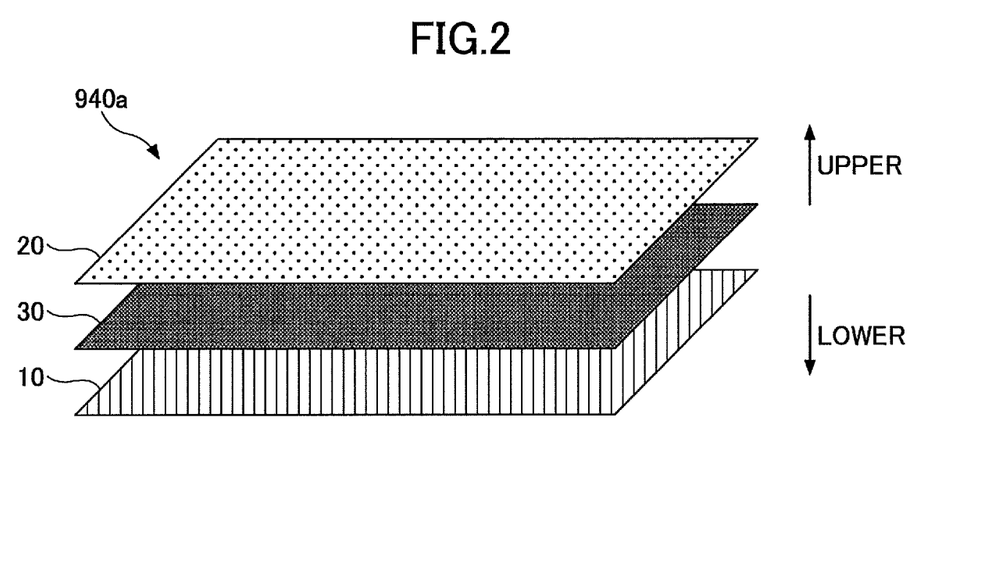
FIG. 2 is a schematic diagram illustrating display image layers of a touch panel.

FIG. 2 is a schematic drawing of a display image layer of a touch panel 940a.

As illustrated in FIG. 2, in the present embodiment, the touch panel 940a has a three-layer structure in which a standard layer 10, a disable layer 20, and an interrupt layer 30 are overlapped and laminated. The lamination direction of the layers may be other than the vertical direction illustrated in FIG. 2.

Figure 5:
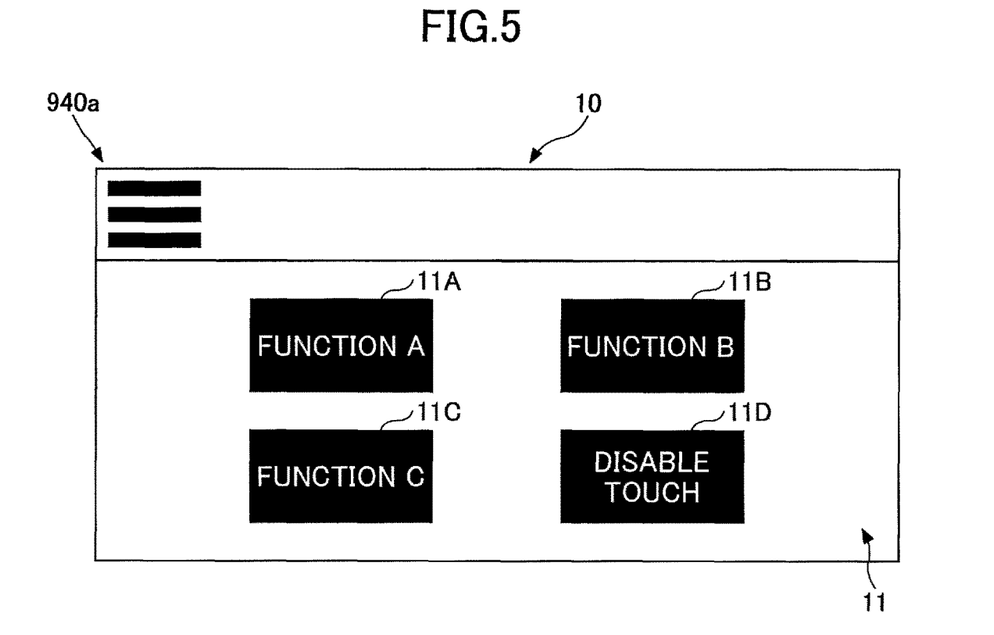
FIG. 5 is a drawing illustrating an example of a home screen including a touch disabling function.
Figure 7:
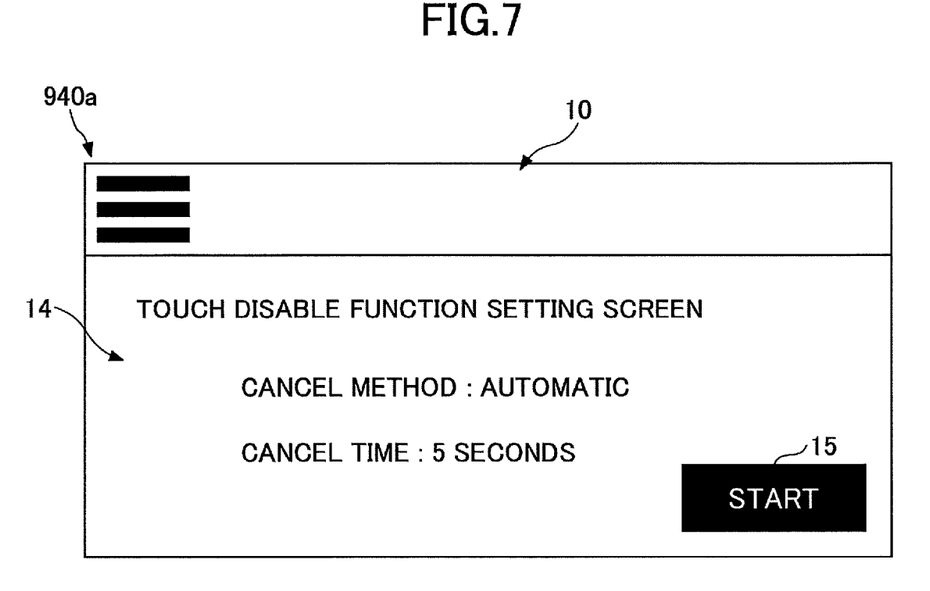
FIG. 7 is a drawing illustrating an example of a touch disabling setting screen.

The standard layer 10 is a display device that displays an operation screen provided for normal use of the touch panel 940a (including a home screen 11 illustrated in FIG. 5, a touch disable function setting screen 14 illustrated in FIG. 7, and the like).

The disable layer 20 is a display device that displays a touch operation disable screen 21 (see FIG. 8 or other drawings) while the touch operation of the touch panel 940a is disabled. The disable layer 20 is positioned on the standard layer 10 and allows the touch operation disable screen 21 to be superimposed on the operation screen.

The interrupt layer 30 is a display device that displays a notification screen 31 (see FIG. 9) that notifies an interrupt event when the interrupt event occurs while the touch operation is disabled. The interrupt layer 30 is positioned between the standard layer 10 and the disable layer 20.

A liquid crystal display (LCD) may be applied to the standard layer 10, for example. A transmissive liquid crystal display may be applied to the disable layer 20 and the interrupt layer 30, for example.

<Functional Configuration>

Figure 3:
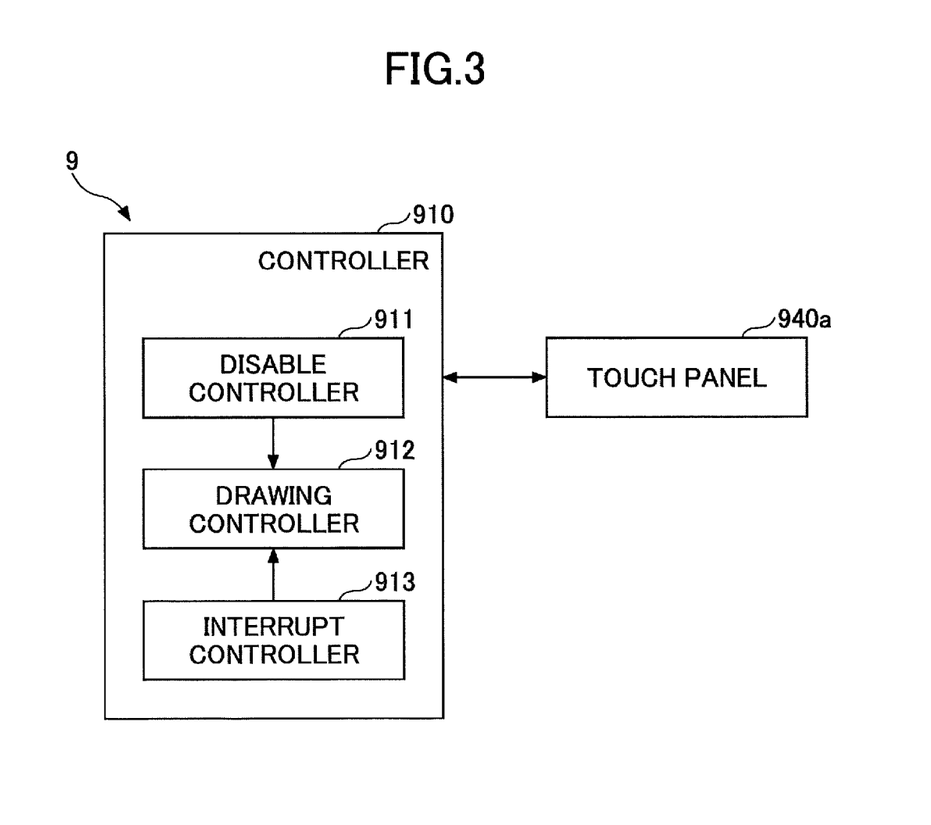
FIG. 3 is a block diagram illustrating functions of the information processing device according to the embodiment.

FIG. 3 is a functional block diagram of the MFP 9 according to the embodiment.

As illustrated in FIG. 3, the controller 910 of the MFP 9 includes a disable controller 911, a drawing controller 912, and an interrupt controller 913.

The disable controller 911 executes a mode (i.e., a touch disable mode) in which the operation input of the touch panel 940a is disabled. In the touch disable mode, a normal operation input performed by a user using the touch panel 940a is not reflected in the operation of the MFP 9. The touch disable mode is executed, for example, in response to receiving an instruction input from a user through the touch panel 940a. When executing the touch disable mode, the disable controller 911 transmits a command indicating the execution of the touch disable mode to the drawing controller 912.

The drawing controller 912 controls the display of each layer of the touch panel 940a (i.e., the standard layer 10, the disable layer 20, and the interrupt layer 30).

The interrupt controller 913 performs control when an interrupt event, such as error detection in any one of the functions of the MFP 9, occurs while the touch operation is disabled. When the interrupt event is detected, for example, the interrupt controller 913 transmits, to the drawing controller 912, a command to notify a user by displaying a notice indicating the interrupt event on the touch panel 940a.

Each function of the controller 910 of the MFP 9 illustrated in FIG. 3 is achieved by operating various hardware under the control of the CPU 901, and reading and writing data in the RAM 902b by loading predetermined computer software (i.e., a touch panel display program) on hardware such as the CPU 901 and the RAM 902b of the controller 910. That is, when the touch panel display program of the MFP 9 according to the present embodiment is executed on a computer, the controller 910 of the MFP 9 functions as the disable controller 911, the drawing controller 912, and the interrupt controller 913 of FIG. 3.

<Method of Setting the Touch Disable Mode>

Figure 4:
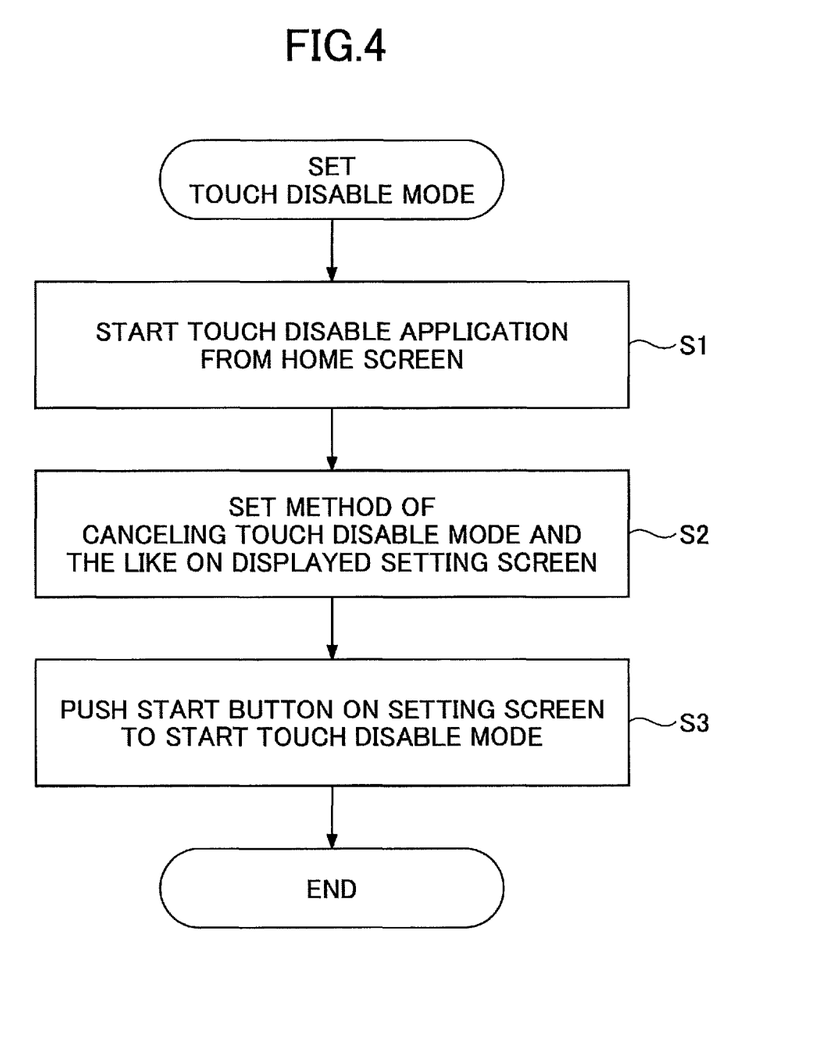
FIG. 4 is a flow chart of setting a touch disable mode.

Referring to FIGS. 4 to 7, a method of setting the touch disable mode will be described. FIG. 4 is a flowchart illustrating the setting of the touch disable mode.

In step S1, a touch disable application is started from the home screen 11 displayed in the standard layer 10.

FIG. 5 is a drawing illustrating an example of the home screen 11 including a touch disable function. The home screen 11 displays one or more icons (in FIG. 5, four icons 11A to 11D) for starting one or more applications installed in the MFP 9. In the example of FIG. 5, the function of the touch disable mode is provided as one application. In this case, the icon 11D of the touch disable application is disposed on the home screen 11 in a manner substantially same as the icons 11A to 11C of other function applications. In the example of FIG. 5, a touch disable mode setting can be started by touching the icon 11D when the home screen 11 is displayed.

Figure 6:
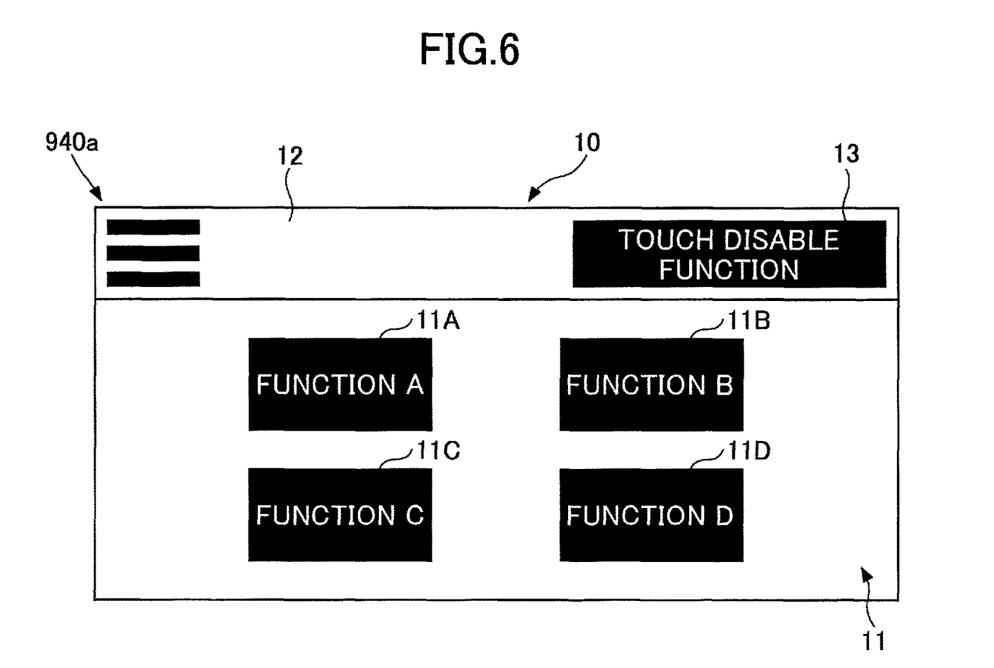
FIG. 6 is a drawing illustrating another example of the home screen including the touch disabling function.

FIG. 6 is a drawing illustrating another example of the home screen 11 including the touch disable function. In the example of FIG. 6, a button 13 for starting the touch disable mode is disposed in a banner portion 12 at the upper portion of the home screen 11. When an application other than the touch disable mode is started, the banner portion 12 is always displayed on the standard layer 10 even if the home screen 11 is not displayed on the standard layer 10. Thus, in the example of FIG. 6, the touch disable mode setting can be started even when another application is started and the home screen 11 is not displayed, in addition to when the home screen 11 is displayed.

In the examples illustrated in FIG. 5 and FIG. 6, a command to start the touch disable mode may be placed in a menu displayed by pressing a "setting button" typically provided on the device operation panel.

Returning to FIG. 4, in step S2, a method for canceling the touch disable mode and the like are set in the displayed touch disable function setting screen 14.

FIG. 7 is a drawing illustrating an example of the touch disable function setting screen 14. The touch disable function setting screen 14 is displayed in the standard layer 10 in response to the operation in step S1.

In the example of FIG. 7, an item of a method of canceling the touch disable mode is displayed in the touch disable function setting screen 14. The cancel method may include "automatic" with a time limit or "manual" with a specific operation such as pressing a cancel button for an extended period of time. A user may select from one or both of them. In addition, the time and the like may be set depending on the cancel method. In the example of FIG. 7, if "automatic" is selected as the cancel method, the time required to cancel the touch disable mode (i.e., cancel time) is set to "5 seconds".

In step S3, the touch disable mode is started by pushing a start button 15 of the touch disable function setting screen 14.

In the example of FIG. 7, the start button 15 is disposed at the lower right of the touch disable function setting screen 14, and the touch disable mode is automatically canceled when 5 seconds has passed after the start of the touch disable mode. When "manual" is selected as the cancel method in the touch disable function setting screen 14 of FIG. 7, for example, the touch disable mode is canceled in response to the touch operation performed on an end button 23 displayed on the touch operation disable screen 21 of the disable layer 20.

When the touch disable mode is canceled, for example, the screen returns to the touch disable function setting screen 14. Subsequently, the screen may return to the home screen 11 by performing a normal operation of the operation panel, or another application may be started.

<Screen Example in the Touch Disable Mode>

Figure 8:
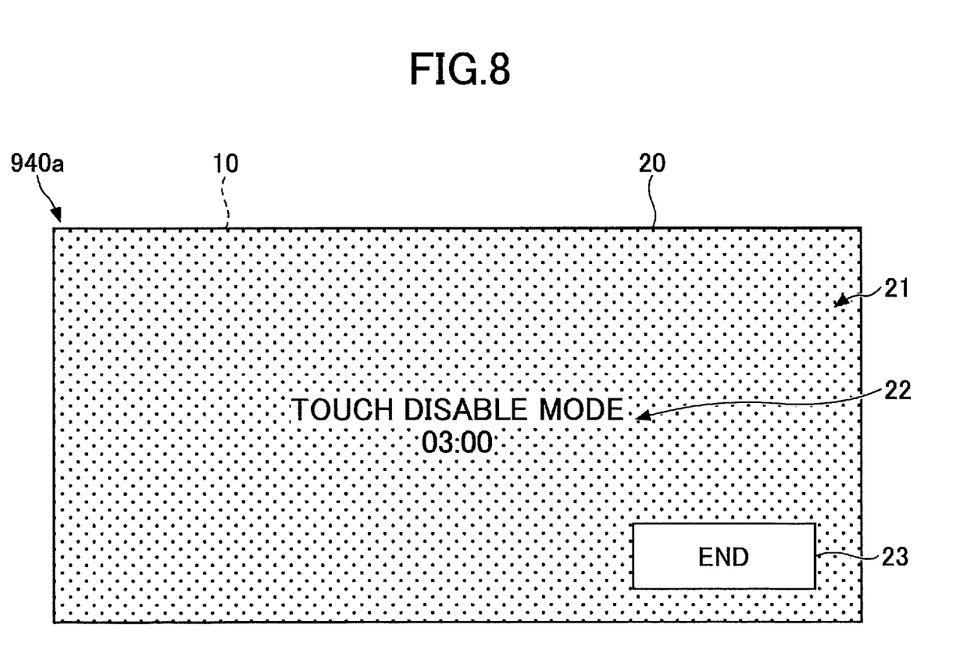
FIG. 8 is a drawing illustrating a display example of a disable layer.
Figure 9:
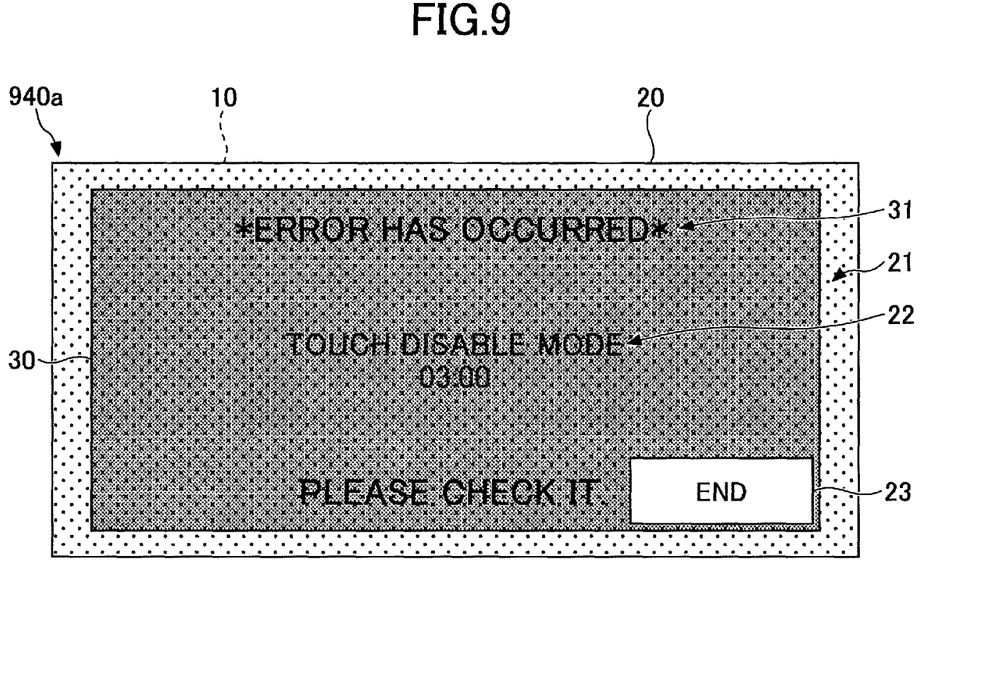
FIG. 9 is a drawing illustrating a display example of an interrupt layer.

Referring to FIG. 8 and FIG. 9, a screen example of the touch panel in the touch disable mode will be described. FIG. 8 is a drawing illustrating a display example of the disable layer 20. The display of each layer of the touch panel 940a exemplified in FIG. 8 and FIG. 9 is controlled by the drawing controller 912.

When the touch disable mode is started, the touch operation disable screen 21 is displayed on the disable layer 20, as illustrated in FIG. 8. The touch operation disable screen 21 is superimposed on the operation screen of the home screen 11 or the like displayed on the standard layer 10 and is displayed to hide the operation screen.

The end button 23 is provided on the touch operation disable screen 21. When the end button 23 is touched, the touch disable mode is terminated. In the touch operation disable screen 21, the touch panel 940a is configured not to respond in a case where an area other than the end button 23 is touched. Additionally, on the touch operation disable screen 21, a display indicating a touch disable state or a countdown display 22 indicating the time for which the touch disable state continues may be provided.

Further, the touch operation performed on the end button 23 can be disabled with conditions by not responding to an operation performed on the end button 23 other than a specific operation such as a long press.

FIG. 9 is a drawing illustrating a display example of the interrupt layer 30. When an interrupt event such as an error of any element in the MFP 9 occurs during the touch disable mode, the interrupt layer 30 displays, for example, the notification screen 31 for notifying the interrupt event, as illustrated in FIG. 9. For example, a message such as "Error has occurred. Please check it." is displayed on the notification screen 31. The drawing controller 912 displays the notification screen 31 on the interrupt layer 30 based on a command transmitted to the drawing controller 912 when the interrupt controller 913 detects the interrupt event.

As described above, because the interrupt layer 30 is positioned between the standard layer 10 and the disable layer 20, the notification screen 31 is drawn on the home screen 11 of the standard layer 10 and under the touch operation disable screen 21 of the disable layer 20. According to the present embodiment, a function, in which an operation cannot be performed on a screen displayed under the touch operation disable screen 21 when the touch operation disable screen 21 is displayed, is provided. With the above-described lamination structure, the notification screen 31 is necessarily displayed under the touch operation disable screen 21. Therefore, when the touch operation disable screen 21 and the notification screen 31 are simultaneously displayed, if an operation is input on the notification screen 31, the operation is not accepted by using the above-described function. Consequently, an incorrect operation performed on the notification screen 31 displaying an error can be prevented.

Figure 10:
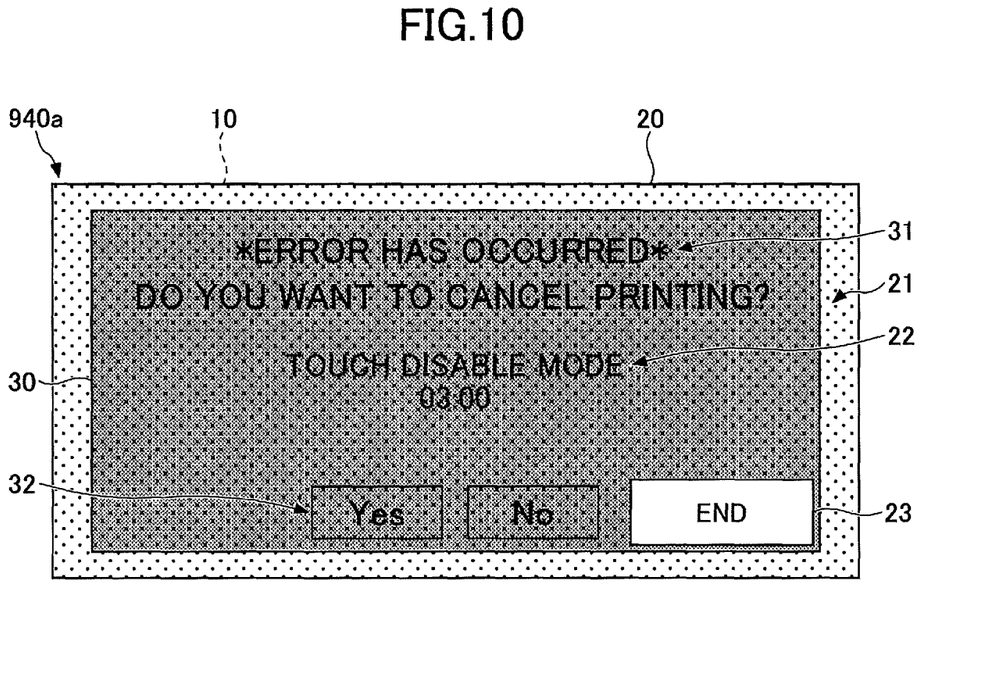
FIG. 10 is a drawing illustrating another display example of the interrupt layer.

FIG. 10 is a drawing illustrating another example of the interrupt layer 30. In FIG. 10, for example, a message such as "Error has occurred. Do you want to cancel printing?" is displayed on the notification screen 31, and buttons 32 for inputting an operation of whether to cancel printing or not are displayed. The above-described effect of preventing an incorrect operation performed on the notification screen 31 is particularly effective when any input function such as the buttons 32 (in addition to the buttons 32, a button for closing the display because the error content has been confirmed) are displayed on the notification screen 31, as illustrated in FIG. 10. The display of the notification screen 31 illustrated in FIG. 10 prevents the user from operating the buttons 32 without checking the error message. This kind of situation can happen, for example, when wiping the panel by using the disable mode.

As with the touch operation disable screen 21 illustrated in FIG. 8, the notification screen 31 is superimposed on a standard screen (e.g., the home screen 11) of the standard layer 10 and is displayed to hide the standard screen. Further, when the notification screen 31 is displayed, the display mode of the touch operation disable screen 21 is changed to be semi-transparent (or transparent). Therefore, the notification screen 31 can be viewed by the user while the standard screen is hidden.

The user who has confirmed the error notification on the notification screen 31 can cancel the touch disable mode by performing an operation such as pressing the end button 23 for an extended period of time, and can check the error notification and perform an operation to solve the error.

As described above, the MFP 9 according to the present embodiment includes the standard layer 10 that displays an operation screen provided for normal use of the touch panel 940a (such as the home screen 11), a disable layer 20 provided to overlap the standard layer 10, an interrupt layer 30 provided to overlap the standard layer 10 and the disable layer 20, a disable controller 911 that disables the touch operation of the touch panel 940a, and a drawing controller 912 that displays the touch operation disable screen 21 on the disable layer 20 to superimpose the touch operation disable screen 21 on the operation screen in a case where the touch operation is disabled by the disable controller 911. The drawing controller 912 displays the notification screen 31 that notifies an interrupt event on the interrupt layer 30 when an interrupt event has occurred while the touch operation is disabled.

With this configuration, when an interrupt event such as an error is detected during the execution of the touch disable mode, the notification screen 31 on the interrupt layer 30 can be displayed to notify a user that the event has occurred, while the touch operation disable screen 21 on the disable layer 20 is displayed to maintain the disable mode. Consequently, the MFP 9 according to the present embodiment can display the interrupt notification during the disable mode of the touch panel 940a and can maintain the disable mode.

Each function of the embodiment described above may be implemented by one or more processing circuits. Here, a "processing circuit" in the present specification includes a processor programmed to perform each function with software, such as a processor implemented by electronic circuits, and a device designed to perform each function described above, such as an application specific integrated circuit (ASIC), a digital signal processor (DSP), a field programmable gate array (FPGA), and a conventional circuit module.

Although the MFP 9 is exemplified as the information processing device according to the above-described embodiment, the information processing device is not limited to the MFP as long as the device includes an element equivalent to the touch panel 940a. The information processing device may be, for example, a projector (PJ), an interactive white board (IWB) (i.e., a white board having a function of an electronic chalkboard that can perform mutual communication), an output device such as a digital signage, a head up display (HUD) device, an industrial machine, an imaging device, a sound collecting device, a medical device, a network home appliance, a connected car, a personal computer, a mobile phone, a smartphone, a tablet terminal, a game console, a personal digital assistant (PDA), a digital camera, a wearable PC, or a desktop PC.

The embodiment has been described above with reference to the specific examples. However, the present disclosure is not limited to the specific examples. Examples, in which design modifications have been appropriately made to these examples by those skilled in the art, are also included in the present disclosure as long as the examples have the features of the present disclosure. Each element provided in the specific examples described above, and the arrangement, conditions, shape, and the like thereof, are not limited to those exemplified, and may be appropriately modified. A combination of the elements provided in the specific examples may be appropriately changed, unless there is a technical inconsistency.

In the above embodiment, a configuration, in which the interrupt layer 30 is positioned between the standard layer 10 and the disable layer 20, is exemplified, but at least a configuration, in which the standard layer 10, the disable layer 20, and the interrupt layer 30 are laminated, is required, and the interrupt layer 30 may be positioned on the disable layer 20.

What is claimed is:

1. An information processing device comprising:
a standard layer configured to display an operation screen provided for use of a touch panel;
a disable layer provided to overlap the standard layer;
an interrupt layer provided to overlap the standard layer and the disable layer;
a processor; and
a memory storing program instructions that cause the processor to:
disable a touch operation of the touch panel;
display a touch operation disable screen on the disable layer to superimpose the touch operation disable screen on the operation screen, in a case where the touch operation is disabled; and
display, when an interrupt event has occurred while the touch operation is disabled, a notification screen on the interrupt layer, the notification screen notifying the interrupt event and providing an input function,
wherein the disable layer and the interrupt layer are a transmissive display
wherein the interrupt layer is provided between the standard layer and the disable layer, and
wherein the processor disables the input function of the notification screen, in the case where the touch operation is disabled.

2. The information processing device as claimed in claim 1,
wherein the processor changes the touch operation disable screen on the disable layer to be transparent or semi-transparent when displaying the notification screen on the interrupt layer.

3. A touch panel display method comprising
disabling a touch operation of a touch panel;
displaying, in a case where the touch operation is disabled, a touch operation disable screen on a disable layer to superimpose the touch operation disable screen on an operation screen provided for use of the touch panel, the disable layer being provided to overlap a standard layer, and the standard layer displaying the operation screen, displaying, when an interrupt event has occurred while the touch operation is disabled, a notification screen on an interrupt layer, the interrupt layer being provided to overlap the standard layer and the disable layer, and the notification screen notifying the interrupt event and providing an input function, and disabling the input function of the notification screen in the case where the touch operation is disabled, wherein the interrupt layer is provided between the standard layer and the disable layer,.

4. A non-transitory computer-readable recording medium having stored therein a touch panel display program for causing a computer to perform:

disabling a touch operation of a touch panel;

displaying, in a case where the touch operation is disabled, a touch operation disable screen on a disable layer to superimpose the touch operation disable screen on an operation screen provided for use of the touch panel, the disable layer being provided to overlap a standard layer, and the standard layer displaying the operation screen, and displaying, when an interrupt event has occurred while the touch operation is disabled, a notification screen on an interrupt layer, the interrupt layer being provided to overlap the standard layer and the disable layer, and the notification screen notifying the interrupt event and providing an input function, and disabling the input function of the notification screen in the case where the touch operation is disabled, wherein the interrupt layer is provided between the standard layer and the disable layer.

* * * * *